(12) United States Patent
Mendels et al.

(10) Patent No.: US 10,337,879 B2
(45) Date of Patent: Jul. 2, 2019

(54) TRAVEL ASSISTANCE

(71) Applicant: Intel Corporation, Santa Clara, CA (US)

(72) Inventors: Omri Mendels, Tel Aviv (IL); Rami Mayer, Ra'anana (IL); Ronen Soffer, Tel Aviv (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 15/129,869

(22) PCT Filed: Dec. 24, 2015

(86) PCT No.: PCT/US2015/000433
§ 371 (c)(1),
(2) Date: Sep. 28, 2016

(87) PCT Pub. No.: WO2017/111856
PCT Pub. Date: Jun. 29, 2017

(65) Prior Publication Data
US 2018/0017404 A1    Jan. 18, 2018

(51) Int. Cl.
*G01C 21/36* (2006.01)
*G01C 21/34* (2006.01)

(52) U.S. Cl.
CPC ..... *G01C 21/3617* (2013.01); *G01C 21/3484* (2013.01); *G01C 21/362* (2013.01); *G01C 21/3611* (2013.01); *G01C 21/3641* (2013.01); *G01C 21/3661* (2013.01); *G01C 21/3667* (2013.01)

(58) Field of Classification Search
CPC ........... G01C 21/3617; G01C 21/3641; G01C 21/3484; G01C 21/3611; G01C 21/362; G01C 21/3667; G01C 21/3661

USPC ....................... 455/456.3; 701/483
See application file for complete search history.

(56) References Cited

U.S. PATENT DOCUMENTS

| | | | |
|---|---|---|---|
| 2010/0131148 A1 | 5/2010 | Camhi et al. | |
| 2012/0084248 A1* | 4/2012 | Gavrilescu | G06F 17/30867 706/52 |
| 2012/0284597 A1 | 11/2012 | Burkard et al. | |
| 2013/0303192 A1* | 11/2013 | Louboutin | G06Q 30/0261 455/456.3 |

FOREIGN PATENT DOCUMENTS

JP    2006-151081 A    6/2006

OTHER PUBLICATIONS

International Search Report and Written Opinion for International Patent Application No. PCT/US2015/000433, dated Sep. 1, 2016, 21 pages.
International Preliminary Report on Patentability for International Patent Application No. PCT/US2015/000433, dated Jul. 5, 2018, 18 pages.

* cited by examiner

*Primary Examiner* — Nga X Nguyen
(74) *Attorney, Agent, or Firm* — Jordan IP Law, LLC (57) ABSTRACT

Apparatus, systems, and/or methods may provide travel assistance. For example, a determination may be made that a user is to begin driving in the near future. In addition, a determination may be made of one or more predicted destinations when the user is to begin driving in the near future. Thus, travel assistance may be provided to the user based on the one or more predicted destinations when the user is to begin driving in the near future.

25 Claims, 4 Drawing Sheets

TRAVEL ASSISTANCE

CROSS-REFERENCE TO RELATED APPLICATIONS

The present application is a U.S. National Phase Patent Application which claims benefit to International Patent Application No. PCT/US2015/000433 filed on Dec. 24, 2015.

TECHNICAL FIELD

Embodiments generally relate to travel assistance. More particularly, embodiments relate to travel assistance based on a determination that a user is to begin driving in the near future.

BACKGROUND

A user may interact with a navigation application on a computing platform to obtain a direction to a destination (e.g., an address), to determine an estimated time of arrival (ETA) to the destination, and so on. The user may, however, take time away from reaching the destination to program from the navigation application. In addition, information provided to a user before a drive may not be specific to a context of a drive that the user actually makes (e.g., general traffic patterns, based on limited rule-based approaches). Moreover, a connection with a vehicle may be needed to receive information, which may also cause delay or provide information that is not context specific. Thus, there is considerable room for improvement to save user time, to minimize receipt of irrelevant information, etc.

BRIEF DESCRIPTION OF THE DRAWINGS

The various advantages of the embodiments will become apparent to one skilled in the art by reading the following specification and appended claims, and by referencing the following drawings, in which:

DESCRIPTION OF EMBODIMENTS

Travel assistance may be provided on a computing platform such as, for example, a desktop computer, a notebook computer, a tablet computer, a convertible tablet, a personal digital assistant (PDA), a mobile Internet device (MID), a media player, a smart phone, a smart televisions (TV), a radio, a wearable device (e.g., smart watch), a vehicle infotainment system, and so on.

The computing platform may include communication functionality such as, for example, wireless communication functionality such as, for example, cellular telephone (e.g., Wideband Code Division Multiple Access/W-CDMA (Universal Mobile Telecommunications System/UMTS), CDMA2000 (IS-856/IS-2000), etc.), WiFi (Wireless Fidelity, e.g., Institute of Electrical and Electronics Engineers/ IEEE 802.11-2007, Wireless Local Area Network/LAN Medium Access Control (MAC) and Physical Layer (PHY) Specifications), 4G LTE (Fourth Generation Long Term Evolution), Bluetooth (e.g., Institute of Electrical and Electronics Engineers/IEEE 802.15.1-2005, Wireless Personal Area Networks), WiMax (e.g., IEEE 802.16-2004, LAN/ MAN Broadband Wireless LANS), Global Positioning System (GPS), spread spectrum (e.g., 900 MHz), NFC (Near Field Communication, ECMA-340, ISO/IEC 18092), and other radio frequency (RF) purposes.

Travel assistance may be provided when a user indicates an intent to begin driving in the near future (e.g., soon, shortly, within a relatively short period of time, imminently, etc.). For example, travel assistance may be provided on a mobile computing platform en route to, but before reaching, a vehicle based a determination that the user is about to start driving when the user leaves a present location. In this regard, an activity of the user (e.g., walking away from a present location) may indicate the intent to begin driving and a time (e.g., that it takes from the start of the activity or completion of the activity to begin to drive) may indicate whether driving is to occur in the near future. The time may be based on, for example, a distance from the vehicle, routine data (e.g., typical stops, a gate, etc.), acceleration, time of day, etc.

Thus, travel assistance (e.g., travel data, etc.) may be provided when the user is to actually use travel data (e.g., is about to drive) rather than some unknown time before the user is to drive or in response to a request for the travel data. In addition, the travel assistance may include content that is specific to a drive that the user actually intends to make. Moreover, the travel assistance may be provided before the user reaches the vehicle, while en route to the vehicle, and/or before the user starts the vehicle (e.g., powers on vehicle systems) to allow the user to determine whether to arrive at the vehicle faster, whether to begin driving, whether to change plans and perform another activity in the near future rather than drive (e.g., based on ETA of predicted destinations, recently changing traffic patterns, etc.), and so on.

Figure 1:
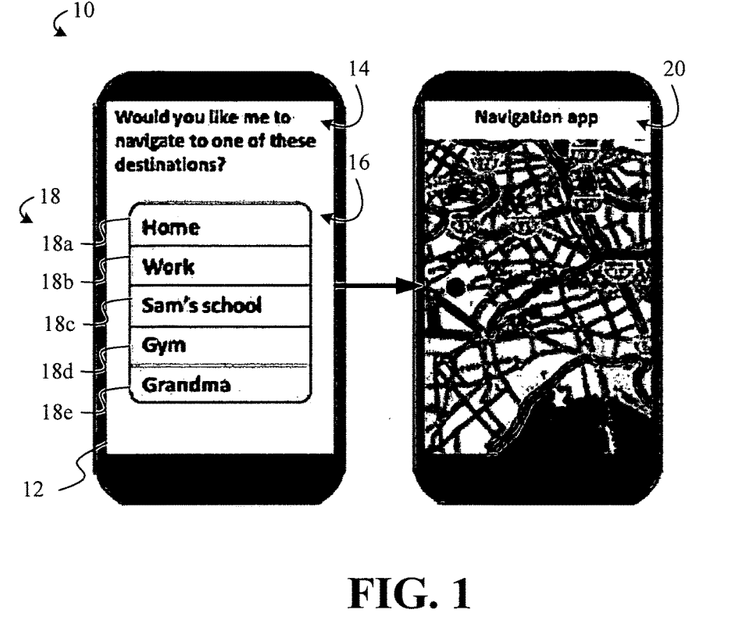
FIG. 1 is an example of travel assistance to be provided using a mobile phone according to an embodiment.

FIG. 1 illustrates an example of travel assistance to be provided using a mobile phone 10 according to an embodiment. In the illustrated example, a user interface 12 provides an offer 14 of travel assistance to a user when the user is to begin driving in the near future. While a graphical user interface (GUI) is shown for illustration, any interface may be utilized to provide travel assistance such as, for example, an audio interface (e.g., voice user interface), a taction interface, and so on.

A determination that the user is to begin driving in the near future may be based on a recognition of, for example, a current departure state of the user, that the user is currently approaching a parking location, a current connection between the user and a vehicle, that a current state satisfies a user routine, that a current state satisfies a user calendar event, and so on. In addition, a determination may be made that the user is driving, which may also trigger the offer 14 to be rendered to the user. The offer 14 may, however, be bypassed and/or withheld, as discussed below.

Additionally, the mobile phone 10 may recognize and/or process data at different times to determine that the user is to begin driving in the near future. For example, the mobile device 10 may recognize data for walking, data for a user routine (e.g., shower routine), and/or data for a calendar (e.g., an upcoming meeting) before a departure action (e.g., user leaves a house). In addition, the mobile phone 10 may recognize data for approaching a parking location (e.g., where the vehicle is parked) during the departure action (e.g., walking to the vehicle). The mobile phone 10 may also recognize data for a connection with the vehicle (e.g., Bluetooth, NFC, etc.) when the user is near the vehicle and/or starts the vehicle. Moreover, the mobile phone 10 may recognize data for driving when the user is actually driving the vehicle.

In the illustrated example, the user interface 12 provides a list 16 of predicted destinations 18 (18a-18e). The predicted destinations 18 may be generated based on historical data. For example, the predicted destinations 18 may be based on a destination visited by the user, a point of interest by the user, a meeting location that the user is to attend, an area searched by the user, and so on. In addition, the predicted destinations 18 may be generated based on a current state data. For example, the predicted destinations 18 may be based on a current time of day, a current day of week, an arrival time, a distance to the predicted destination, and a pending meeting (e.g., upcoming meeting time, location, date, etc.), and so on.

Additionally, the list 16 of predicted destinations 18 (18a-18e) may be unsorted or sorted in any order. For example, the list 16 may be sorted based on most probable destination to least probable destination, least probable destination to most probable destination, in a hierarchy with main nodes at a top level displayed first, and so on. The list 16 may be sorted based on a probability value assigned to each of the predicted destinations 18 (e.g., ranked from most probable to least probable based on the probability value, hierarchy with main nodes at the top level based on the probability value, etc.). The probability value may be based on, for example, the historical data and the current state data. In addition, the list 16 may be sorted based on other criteria such as, for example, categories for the hierarchy. In the illustrated example, the predicted destination 18a "Home" has the highest probability value and is listed first in the list 16. The list 16 may, however, be bypassed and/or withheld, as discussed below.

In the illustrated example, the user interface 12 provides travel data for a selected destination from among the predicted destinations 18 (18a-18e). In one example, the destination may be selected by the user (e.g., by touch, by speech, etc.) to automatically launch the navigation application 20 for navigation data to the selected destination. In this regard, the navigation data may includes a direction to the selected destination including a map (e.g., step-by-step direction). The direction may include text-to-speech, a list view, and so on. In addition, the mobile phone 10 may provide other travel information such as route data, discussed below.

In another example, the offer 14 and the list 16 may be bypassed and/or withheld from the user interface 12 to automatically provide the navigation data via the navigation application 20. In this regard, the navigation application 20 may automatically be launched when one of the predicted destinations 18 satisfies a confidence threshold. In the illustrated example, the probability value of the predicted destination 18a "Home" may be sufficiently high that there is complete confidence the user is about to drive home (or is driving home), and travel information (e.g., a direction, route data, etc.) may be automatically provided to the user. Where two or more of the predicted destinations 18 satisfy the confidence threshold, a highest probability value may be determinative.

Figure 2:
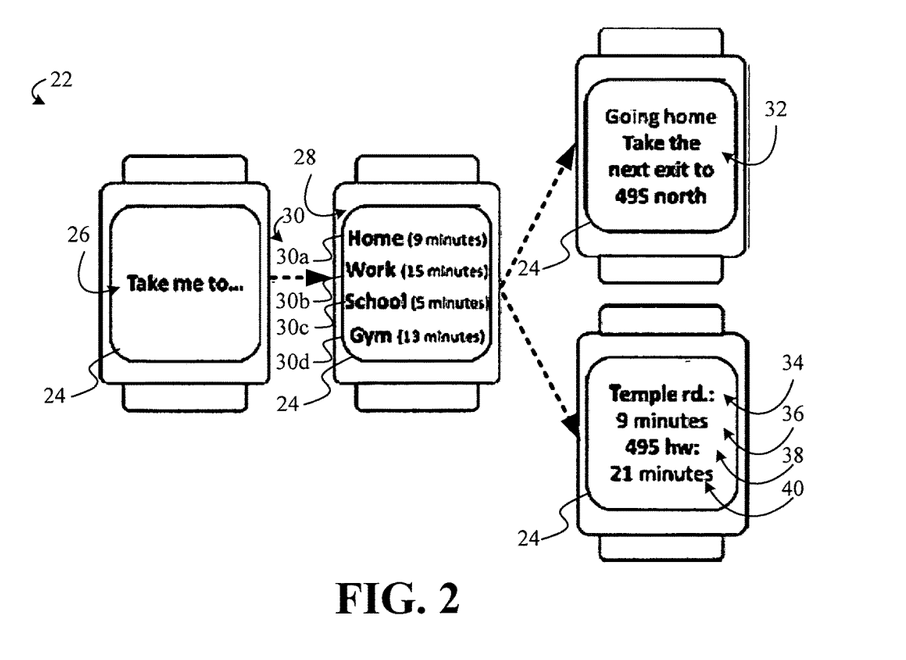
FIG. 2 is an example of travel assistance to be provided using a smart watch according to an embodiment.

Turning now to FIG. 2, an example of travel assistance to be provided using a smart watch 22 is shown according to an embodiment. The smart watch 22 may have the same or different functionality as the mobile phone 10 (FIG. 1), discussed above, and vice versa. Thus, the smart watch 22 includes an interface 24 that provides an offer 26 including one or more characters (e.g., "Take me to . . . ") and a list 28 of predicted destinations 30 (30a-30e) together with ETAs in response to acceptance of the office 26 by the user (e.g., by touching the prompt, speaking the phrase from the prompt, etc.). The list 28 may also be provided based on a response by the user to an open offer made by the smart watch 22 that is not visible (e.g., automatically accepted when the user speaks the phrase without a prompt). The offer 26 may, however, be bypassed and/or withheld to automatically provide the list 28.

While the smart watch 22 may provide navigation data for a selected destination, the smart watch 22 provides route data for the selected destination in the illustrated example. For example, the smart watch 22 may provide a nearest (e.g., next) part 32 (e.g., relative to the user) of a shortest route to the destination "Home" based on a selection of the predicted destination 30a as the intended destination in the context of the drive. The user may, for example, be driving and approaching the nearest part 32, and the smart watch 22 may determine that user only needs or desires the nearest part 32 based on a determination that the user is aware of a direction to the selected destination "Home" (e.g., via user preference, machine learning, etc.).

The smart watch 22 may also provide information for two or more alternative routes to the selected destination "Home". For example, the smart watch 22 may provide a nearest (e.g., next) part 34 of a shortest route to the selected destination "Home", with or without ETA 36 for the route, and may provide a nearest (e.g., next) part 38 of an alternative route, with or without ETA 40 for the alternative route. In this regard, the user may choose the preferred route and/or the preferred nearest (e.g., next) part from among alternative routes.

Figure 3:
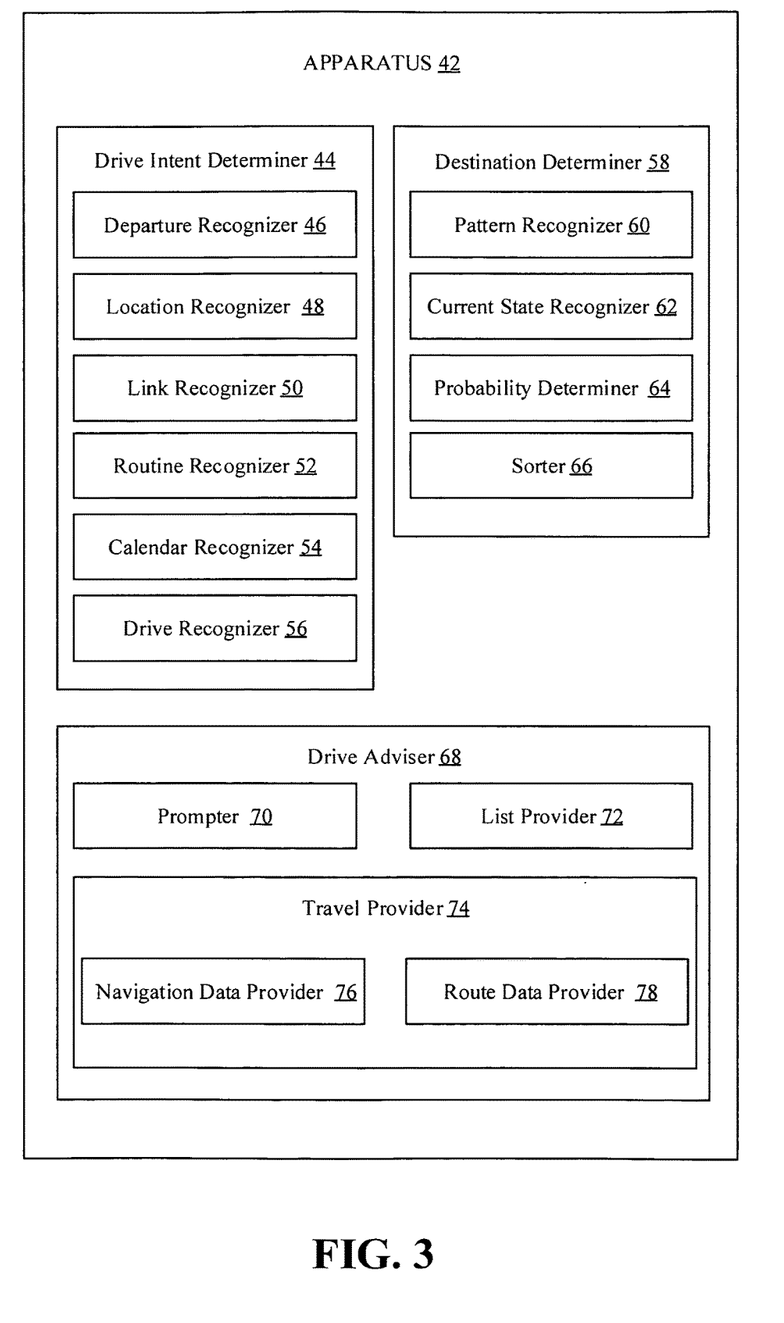
FIG. 3 is a block diagram of an example of an apparatus to provide travel assistance according to an embodiment.

FIG. 3 illustrates an example of an apparatus 42 to provide travel assistance according to an embodiment. The apparatus 42 may include a computing platform such as, for example, a desktop computer, a notebook computer, a tablet computer, a convertible tablet, a personal digital assistant (PDA), a mobile Internet device (MID), a media player, a smart phone, a smart televisions (TV), a radio, a wearable device (e.g., smart watch), a vehicle infotainment system, and so on. Thus, the apparatus 40 may include the mobile phone 10 (FIG. 1) and/or the smart watch 22 (FIG. 2), discussed above, and may have the same or different functionality thereof.

The illustrated apparatus 42 includes a drive intent determiner 44 to determine a user is to begin driving in the near future. The drive intent determiner 44 includes a departure recognizer 46 to recognize a current departure state of the user. The current departure state of the user may be based on sensory data (e.g., location, acceleration, etc.) to determine a departure activity of the user. The departure activity may include, for example, walking, running, etc., to a vehicle. The departure activity may also include, for example, leaving a place such as a home, an office, a store, a park, an event, and so on. In one example, changes in communication data (e.g., WiFi signal, GPS data, etc.) may indicate the user is leaving a place. Further non-limiting examples of departure activity may include the end of exercise activity (e.g., at a gym, etc.), showering activity, walking up a staircase, elevator usage, and so on.

The drive intent determiner 44 further includes a location recognizer 48 to recognize the user is currently approaching a parking location. For example, the location recognizer 48 may use location data for the vehicle based parking location from the vehicle, based on parking location recorded when the vehicle was parked, based on parking patterns (e.g., assigned space, favorite space, favorite garage, only garage, company garage, event parking, etc.), and so on. The drive intent determiner 44 further includes a link recognizer 50 to recognize a current connection between the user and the vehicle. For example, the link recognizer 50 may determine that the apparatus 12 is currently connected with the vehicle via a Bluetooth connection, a WiFi connection, a USB connection, an NFC connection, and so on. In one example, the link recognizer 50 may determine that the apparatus 12 is connected with a speaker of the vehicle when the vehicle is turned on and parked before being driven.

The drive intent determiner 44 further includes a routine recognizer 52 to recognize a current state satisfies a user routine. For example, the routine recognizer 52 may recognize that the user usually arrives to the vehicle at 8:30 AM on a weekday after eating breakfast at the neighborhood café. In this regard, the routine recognizer 52 may determine that a current state of time (e.g., 8:15 AM), a current state of day or date (e.g., weekday, holiday, etc.), a current state of the user (e.g., satiated), and/or a current state of location (e.g., neighborhood café) indicate that the user is about to start driving (e.g., 8:15 AM on a weekday indicates user is about to drive, especially in light of other factors such as departure activity, etc.).

The drive intent determiner 44 further includes a calendar recognizer 54 to recognize a current state satisfies a user calendar event. For example, the calendar recognizer 54 may determine that the user has a meeting in about thirty minutes, which the user has accepted. Thus, the calendar recognizer 54 may determine that a current state (e.g., time, meeting acceptance, etc.) satisfies the calendar event for the user to indicate that the user is about to start driving (e.g., 9:15 AM on a day where the user accepted an calendar invitation for 9:30 AM).

The drive intent determiner 44 further includes a drive recognizer 56 to recognize the user is currently driving. For example, the drive recognizer 56 may recognize the user is driving when the drive intent determiner 44 fails to determine an intent to start driving in the near future. In addition, the drive recognizer 56 that may recognize the user is driving when, for example, the user has set that no information is to be provided until the user requests it, until the user begins driving, and so on. Notably, any or all sensors used to provide data to the apparatus 12 (e.g., accelerometer, gyrator, GPS sensor, etc.) may be integral and/or in communication with the apparatus 12, the vehicle, and so on. Thus, for example, the drive recognizer 56 may recognize the user is currently driving based on accelerometer data from the apparatus 12, from the vehicle, and so on.

The drive intent determiner 44 may recognize and/or process data at any time. The drive intent determiner 44 may, however, selectively recognize and/or process data based on the type of data. For example, the drive intent determiner 44 may recognize data from the departure recognizer 46, the routine recognizer 52, and the calendar recognizer 54 prior to a departure action by the user (e.g., prior to departure to a vehicle). In addition, the drive intent determiner 44 may recognize data from the location recognizer 48 during the departure action by the user (e.g., on the way to a vehicle). Moreover, the drive intent determiner 44 may recognize data from the link recognizer 50 when the user is in proximity to the vehicle (e.g., in the vehicle, before driving). Also, the drive intent determiner 44 may recognize data from the drive recognizer 56 when the user is currently driving (e.g., after driving starts). For example, the components of the drive intent determiner 44 may be selectively initiated, may selectively recognize data, selectively provide data, and so on.

The illustrated apparatus 42 further includes a destination determiner 58 to determine a predicted destination when the user is to begin driving in the near future. The destination determiner 58 includes a historical pattern recognizer 60 to recognize historical data. The historical data may include destination visited data such as, for example, usual visit days, hours, number of visits to a specific place, typically visits to a specific place after a current location, and so on. In addition, historical data may include point of interest data such as, for example, user points of interest including POIs stored in a navigation application, favorites, and so on. The historical data may also include meeting data such as, for example, an address of a meeting in a calendar application, and so on. In addition, the historical data may include area searched data such as, for example, a place searched in a navigation application, online, and so on.

The destination determiner 58 further includes a current state recognizer 62 to recognize current state data. The current state data may include time of day data (e.g. time of day), day of week data (e.g., day of week), date data (e.g., date), holiday data (e.g., holiday in the geographic area, specific to the user, etc.), arrival time data (e.g., ETA), distance to destination data (e.g., distance in miles, kilometers, etc.), pending meeting data (e.g., meeting time, day, etc.), and so on. Thus, the destination determiner 58 may recognize that the user usually arrives to the vehicle at 8:30 AM in the morning on a weekday after eating breakfast at the neighborhood café. In this regard, the destination determiner 58 may determine that a current state of time (e.g., 8:15 AM), a current state of day or date (e.g., weekday), a current state of a user (e.g., satiated), and/or a current state of location (e.g., the neighborhood café) satisfies the user routine to make the determination of predicted destinations (e.g., 8:15 AM triggers travel assistance to work on a weekday, to home on a weekend, etc.).

The destination determiner 58 further includes a probability determiner 64 to determine a probability value a predicted destination. The probability determiner 64 may determine the probability that the user intends to derive to a destination from the historical data and/or the current state data, and may assign a probability value to the destination. The probability determiner 64 may also reference a confidence threshold and assign the probability value based on the confidence threshold. For example, the probability determiner 64 may be certain that the user intends to drive to one of the candidate destinations, and assigns a probability value that most satisfies the confidence threshold (e.g., to bypass and/or withhold an offer and/or a list). Similarly, the probability determiner 64 may assign a probability value that least satisfies the confidence threshold (e.g., to exclude the destination from a list).

The destination determiner 58 further includes a sorter 66 to sort the predicted destination. For example, sorter 66 may sort predicted destinations based on most probable destination to least probable destination, least probable destination to most probable destination, in a hierarchy with main nodes at a top level displayed first, and so on. The sorter 66 may also sort based on a probability value assigned to each of the predicted destinations 18 (e.g., ranked from most probable to least probable based on the probability value, hierarchy with main nodes at the top level based on the probability value, etc.). In addition, the sorter 66 may sort based on other criteria such as, for example, categories for the hierarchy.

The illustrated apparatus 42 further includes a drive adviser 68 to provide travel assistance to the user based on the one or more predicted destinations when the user is to begin driving in the near future. The driver adviser 68 includes a prompter 70 to provide an offer of travel assistance to the user via a user interface. The offer may include a question to the user via a graphical user interface, a voice user interface, and so on. The driver adviser 68 further includes a list provider 72 to provide a list of the predicted destinations via the user interface. In one example, the list may include a sorted list. The driver adviser 68 further includes a travel data provider 74 to provide travel data for a selected destination from among the predicted destinations via the user interface. The travel data may include, for example, navigation data, route data, and so on.

In this regard, the travel data provider 74 may include a navigation data provider 76 to provide navigation data for the selected destination. In one example, the navigation data may include a direction to the selected destination. The direction may include a map, a list, text-to-speech, and so on. The travel data provider 74 further includes a route data provider 78 to provide route data for the selected destination. In one example, the route data may include a nearest (e.g., next) part of a shortest route to the selected destination, which may be based on a determination that the user is aware of a direction to the selected destination (e.g., only desires the nearest part). In another example, the route data provider 78 may provide information for two or more alternative routes to the selected destination. For example, the route data provider 78 may provide a nearest (e.g., next) part of a shortest route for either or both alternative routes to the selected destination, ETA information or either or both alternative routes to the selected destination, and so on.

While examples have shown separate components for illustration purposes, it is should be understood that one or more of the components of the apparatus 42 may be combined, may reside in the same and/or different physical and/or virtual locations, and so on, or combinations thereof.

Figure 4:
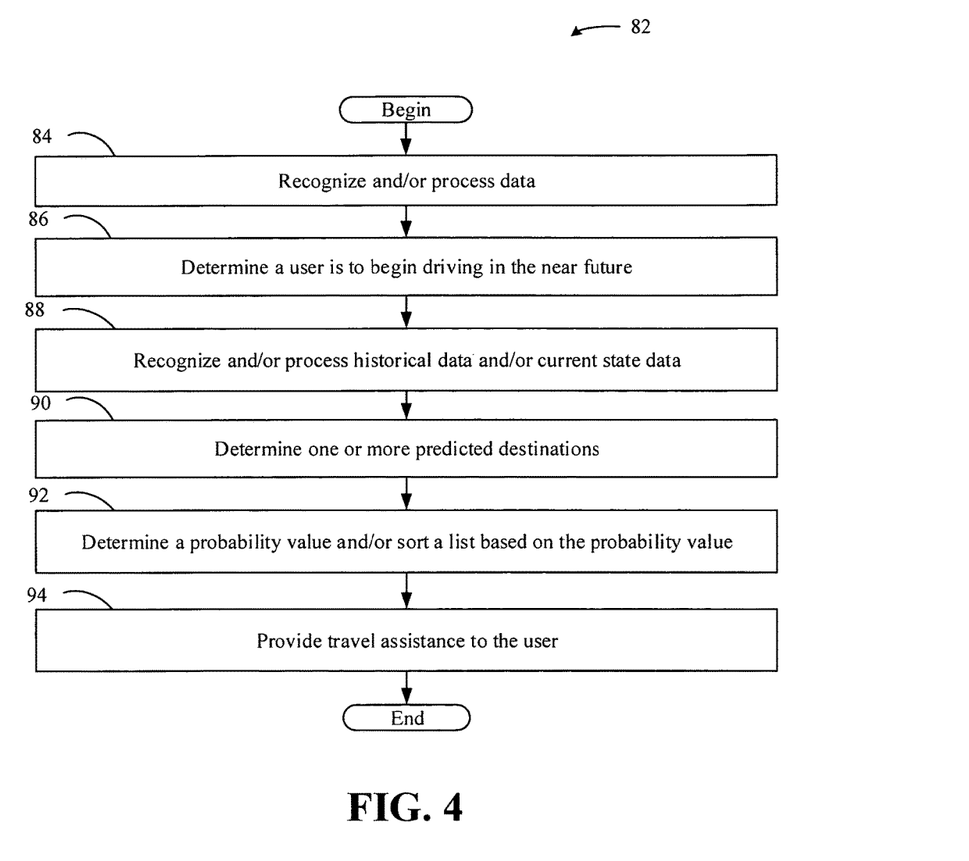
FIG. 4 is a flowchart of an example of a method to provide travel assistance according to an embodiment.

Turning now to FIG. 4, an example of a method 82 to provide travel assistance is shown according to an embodiment. The method 82 may be implemented as one or more modules in a set of logic instructions stored in a machine- or computer-readable storage medium such as random access memory (RAM), read only memory (ROM), programmable ROM (PROM), firmware, flash memory, etc., in configurable logic such as, for example, programmable logic arrays (PLAs), field programmable gate arrays (FPGAs), complex programmable logic devices (CPLDs), in fixed-functionality hardware logic using circuit technology such as, for example, application specific integrated circuit (ASIC), complementary metal oxide semiconductor (CMOS) or transistor-transistor logic (TTL) technology, or any combination thereof. For example, computer program code to carry out operations shown in the method 82 may be written in any combination of one or more programming languages, including an object oriented programming language such as C++ or the like and conventional procedural programming languages, such as the "C" programming language or similar programming languages.

The illustrated processing block 84 recognizes and/or processes data. For example, block 84 may recognize a current departure state of the user, the user is to currently approach a parking location, a current connection between the user and a vehicle, a current state satisfies a user routine, a current state satisfies a user calendar event, and/or the user is currently driving. Block 84 may recognize and/or process data at any time. For example, block 84 may recognize data for the current departure state, data for the user routine, and data for the user calendar event prior to a departure action by the user. In addition, block 84 may recognize data for the parking location during the departure action by the user. Moreover, block 84 may recognize data for the current connection when the user is in proximity to the vehicle. In addition, block 84 may recognize data for driving when the user is currently driving. In response, illustrated processing block 86 determines a user is to begin driving in the near future.

Illustrated processing block 88 recognizes and/or processes historical data and/or current state data. For example, block 88 may recognize and/or process destination visited data, point of interest data, meeting location data, area searched data, time of day data, day of week data, arrival time data, distance to destination data, and/or pending meeting data. In response, illustrated processing block 90 determines one or more predicted destinations when the user is to begin driving in the near future. In addition, illustrated processing block 92 determines a probability value for the one or more predicted destinations and/or sorts the one or more predicted destinations based on the probability value.

Illustrated processing block 94 provides travel assistance to the user based on the predicted destinations when the user is to begin driving in the near future. For example, processing block 94 may provide an offer of travel assistance to the user via a user interface, provide a list of the predicted destinations via the user interface, and/or provide travel data for a selected destination from among the predicted destinations via the user interface. Block 94 may, for example, bypass and/or withhold (e.g., prevent from generating, prevent from displaying, etc.) the offer and the list to automatically provide the travel data to the user based on a confidence threshold that is to be satisfied by the predicted destinations.

Block 94 may also provide navigation data for the selected destination. In one example, the navigation data may include a direction to the selected destination. Moreover, block 94 may provide route data for the selected destination. For example, block 94 may provide a nearest (e.g. next) part of a shortest route to the selected destination. Block 94 may also provide information for two or more alternative routes to the selected destination.

While independent methods, blocks, and/or a particular order has been shown for illustration purposes, it should be understood that one or more of the blocks of any of the method 82 may be combined, omitted, bypassed, re-arranged, and/or flow in any order. In addition, any or all of the aspects of embodiments may be set by the user via, for example, the user interface. Thus, travel assistance may be user specified based and/or context specific.

Figure 5:
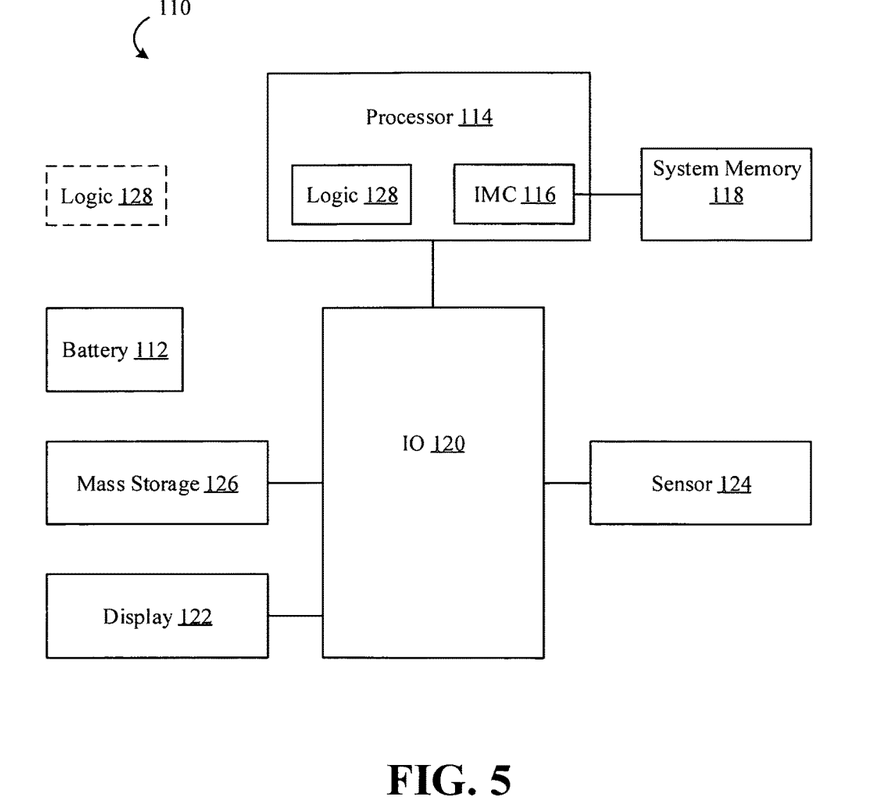
FIG. 5 is a block diagram of an example of a computing device according to an embodiment.

FIG. 5 shows a computing device 110 according to an embodiment. The computing device 110 may be part of a platform having computing functionality (e.g., personal digital assistant/PDA, notebook computer, tablet computer), communications functionality (e.g., wireless smart phone), imaging functionality, media playing functionality (e.g., smart television/TV), wearable functionality (e.g., watch, eyewear, headwear, footwear, jewelry) or any combination thereof (e.g., mobile Internet device/MID). In the illustrated example, the device 110 includes a battery 112 to supply power to the device 110 and a processor 114 having an integrated memory controller (IMC) 116, which may communicate with system memory 118. The system memory 118 may include, for example, dynamic random access memory (DRAM) configured as one or more memory modules such as, for example, dual inline memory modules (DIMMs), small outline DIMMs (SODIMMs), etc.

The illustrated device 110 also includes a input output (IO) module 120, sometimes referred to as a Southbridge of a chipset, that functions as a host device and may communicate with, for example, a display 122 (e.g., touch screen, liquid crystal display/LCD, light emitting diode/LED display), a sensor 124 (e.g., touch sensor, accelerometer, GPS, etc.), and mass storage 126 (e.g., hard disk drive/HDD, optical disk, flash memory, etc.). The processor 114 and the IO module 120 may be implemented together on the same semiconductor die as a system on chip (SoC).

The illustrated processor 114 may execute logic 128 (e.g., logic instructions, configurable logic, fixed-functionality logic hardware, etc., or any combination thereof) configured to implement any of the herein mentioned processes and/or travel assistance technologies, including one or more aspects of travel assistance of the mobile phone 10 (FIG. 1) and/or the smart watch 22, one or more components of the apparatus 42 (FIG. 3), and/or one or more of the processing blocks of the method 82 (FIG. 4), discussed above. In addition, one or more aspects of the logic 128 may alternatively be implemented external to the processor 114.

ADDITIONAL NOTES AND EXAMPLES

Example 1 may include an apparatus to provide travel assistance comprising a drive intent determiner to determine a user is to begin driving in the near future before the user is to start a vehicle, a destination determiner to determine one or more predicted destinations when the user is to begin driving in the near future, and a drive adviser to provide travel assistance to the user based on the one or more predicted destinations when the user is to begin driving in the near future.

Example 2 may include the apparatus of Example 1, further including one or more of a departure recognizer to recognize a current departure state of the user, a location recognizer to recognize the user is to currently approach a parking location, a link recognizer to recognize a current connection between the user and the vehicle, a routine recognizer to recognize a current state satisfies a user routine, a calendar recognizer to recognize a current state satisfies a user calendar event, or a drive recognizer to recognizer the user is currently driving.

Example 3 may include the apparatus of any one of Example 1 to Example 2, wherein the drive intent determiner is to recognize data from the departure recognizer, the routine recognizer, and data from the calendar recognizer prior to a departure action by the user and before the user is to start the vehicle, recognize data from the location recognizer during the departure action by the user and before the user is to start the vehicle, recognize data from the link recognizer when the user is to be in proximity to the vehicle and is to start the vehicle, and recognize data from the drive determiner when the user is to start the vehicle and is to be currently driving.

Example 4 may include the apparatus of any one of Example 1 to Example 3, further including one or more of a historical pattern recognizer to recognize historical data or a current state recognizer to recognize current state data.

Example 5 may include the apparatus of any one of Example 1 to Example 4, wherein the historical data is to include destination visited data, point of interest data, meeting location data, and area searched data, and wherein the current state data is to include time of day data, day of week data, arrival time data, distance to destination data, and pending meeting data.

Example 6 may include the apparatus of any one of Example 1 to Example 5, further including a probability determiner to determine a probability value for the one or more predicted destinations and a sorter to sort the one or more predicted destinations based on the probability value.

Example 7 may include the apparatus of any one of Example 1 to Example 6, further including one or more of a prompter to provide an offer of travel assistance to the user via a user interface, a list provider to provide a list of the one or more predicted destinations via the user interface, or a travel data provider to provide travel data for a selected destination from among the one or more predicted destinations via the user interface.

Example 8 may include the apparatus of any one of Example 1 to Example 7, wherein the offer and the list are to be withheld when the travel data provider is to automatically provide the travel data to the user based on a confidence threshold that is to be satisfied by the one or more predicted destinations.

Example 9 may include the apparatus of any one of Example 1 to Example 8, further including a navigation data provider to provide navigation data for the selected destination, wherein the navigation data is to include a direction to the selected destination, and a route data provider to provide route data for the selected destination, wherein the route data is to include one more of a nearest part of a shortest route to the selected destination based on a determination that the user is aware of a direction to the selected destination or information for two or more alternative routes to the selected destination.

Example 10 may include at least one computer readable storage medium comprising a set of instructions, which when executed by a computer, cause the computer to determine a user is to begin driving in the near future before the user is to start a vehicle, determine one or more predicted destinations when the user is to begin driving in the near future, and provide travel assistance to the user based on the one or more predicted destinations when the user is to begin driving in the near future.

Example 11 may include the at least one computer readable storage medium of Example 10, wherein the instructions, when executed, cause the computer to one or more of recognize a current departure state of the user, recognize the user is to currently approach a parking location, recognize a current connection between the user and the vehicle, recognize a current state satisfies a user routine, recognize a current state satisfies a user calendar event, or recognize the user is currently driving.

Example 12 may include the at least one computer readable storage medium of any one of Example 10 to Example 11, wherein the instructions, when executed, cause the computer to recognize data for the current departure state, data for the user routine, and data for the user calendar event prior to a departure action by the user and before the user is to start the vehicle, recognize data for the parking location during the departure action by the user and before the user is to start the vehicle, recognize data for the current connection when the user is to be in proximity to the vehicle and is to start the vehicle, and recognize data for driving when the user is to start the vehicle and is to be currently driving.

Example 13 may include the at least one computer readable storage medium of any one of Example 10 to Example 12, wherein the instructions, when executed, cause the computer to one or more of recognize historical data or recognize current state data.

Example 14 may include the at least one computer readable storage medium of any one of Example 10 to Example 13, wherein the historical data is to include destination visited data, point of interest data, meeting location data, and area searched data, and wherein the current state data is to include time of day data, day of week data, arrival time data, distance to destination data, and pending meeting data.

Example 15 may include the at least one computer readable storage medium of any one of Example 10 to Example 14, wherein the instructions, when executed, cause the computer to determine a probability value for the one or more predicted destinations and sort the one or more predicted destinations based on the probability value.

Example 16 may include the at least one computer readable storage medium of any one of Example 10 to Example 15, wherein the instructions, when executed, cause the computer to one or more of provide an offer of travel assistance to the user via a user interface, provide a list of the one or more predicted destinations via the user interface, or provide travel data for a selected destination from among the one or more predicted destinations via the user interface.

Example 17 may include the at least one computer readable storage medium of any one of Example 10 to Example 16, wherein the instructions, when executed, cause the computer to withhold the offer and the list to automatically provide the travel data to the user based on a confidence threshold that is to be satisfied by the one or more predicted destinations.

Example 18 may include the at least one computer readable storage medium of any one of Example 10 to Example 17, wherein the instructions, when executed, cause the computer to provide navigation data for the selected destination, wherein the navigation data is to include a direction to the selected destination, and provide route data for the selected destination, wherein the route data is to include one more of a nearest part of a shortest route to the selected destination based on a determination that the user is aware of a direction to the selected destination or information for two or more alternative routes to the selected destination.

Example 19 may include a method to provide travel assistance comprising determining a user is to begin driving in the near future, determining one or more predicted destinations when the user is to begin driving in the near future before the user starts a vehicle, and providing travel assistance to the user based on the one or more predicted destinations when the user is to begin driving in the near future.

Example 20 may include the method of Example 19, further including one or more of recognizing a current departure state of the user, recognizing the user is to currently approach a parking location, recognizing a current connection between the user and the vehicle, recognizing a current state satisfies a user routine, recognizing a current state satisfies a user calendar event, or recognizing the user is currently driving.

Example 21 may include the method of any one of Example 19 to Example 20, further including recognizing data for the current departure state, data for the user routine, and data for the user calendar event prior to a departure action by the user and before the user starts the vehicle, recognizing data for the parking location during the departure action by the user and before the user starts the vehicle, recognizing data for the current connection when the user is in proximity to the vehicle and starts the vehicle, and recognizing data for driving when the user starts the vehicle and is currently driving.

Example 22 may include the method of any one of Example 19 to Example 21, further including one or more of recognizing historical data or recognizing current state data.

Example 23 may include the method of any one of Example 19 to Example 22, wherein the historical data includes destination visited data, point of interest data, meeting location data, and area searched data, and wherein the current state data includes time of day data, day of week data, arrival time data, distance to destination data, and pending meeting data.

Example 24 may include the method of any one of Example 19 to Example 23, further including determining a probability value for the one or more predicted destinations and sorting the one or more predicted destinations based on the probability value.

Example 25 may include the method of any one of Example 19 to Example 24, further including one or more of providing an offer of travel assistance to the user via a user interface, providing a list of the one or more predicted destinations via the user interface, or providing travel data for a selected destination from among the one or more predicted destinations via the user interface.

Example 26 may include the method of any one of Example 19 to Example 25, further including withholding the offer and the list to automatically provide the travel data to the user based on a confidence threshold that is to be satisfied by the one or more predicted destinations.

Example 27 may include the method of any one of Example 19 to Example 26, further including providing navigation data for the selected destination, wherein the navigation data includes a direction to the selected destination, and providing route data for the selected destination, wherein the route data includes one more of a nearest part of a shortest route to the selected destination based on a determination that the user is aware of a direction to the selected destination or information for two or more alternative routes to the selected destination.

Example 28 may include an apparatus to provide travel assistance comprising means for determining a user is to begin driving in the near future before the user starts a vehicle, means for determining one or more predicted destinations when the user is to begin driving in the near future, and means for providing travel assistance to the user based on the one or more predicted destinations when the user is to begin driving in the near future.

Example 29 may include the apparatus of Example 28, further including one or more of means for recognizing a current departure state of the user, means for recognizing the user is to currently approach a parking location, means for recognizing a current connection between the user and the vehicle, means for recognizing a current state satisfies a user routine, means for recognizing a current state satisfies a user calendar event, or means for recognizing the user is currently driving.

Example 30 may include the apparatus of any one of Example 28 to Example 29, further including means for recognizing data for the current departure state, data for the user routine, and data for the user calendar event prior to a departure action by the user and before the user starts the vehicle, means for recognizing data for the parking location during the departure action by the user and before the user starts the vehicle, means for recognizing data for the current connection when the user is in proximity to the vehicle and starts the vehicle, and means for recognizing data for driving when the user starts the vehicle and is currently driving.

Example 31 may include the apparatus of any one of Example 28 to Example 30, further including one or more of means for recognizing historical data or means for recognizing current state data.

Example 32 may include the apparatus of any one of Example 28 to Example 31, wherein the historical data includes destination visited data, point of interest data, meeting location data, and area searched data, and wherein the current state data includes time of day data, day of week data, arrival time data, distance to destination data, and pending meeting data.

Example 33 may include the apparatus of any one of Example 28 to Example 32, further including means for determining a probability value for the one or more predicted destinations and means for sorting the one or more predicted destinations based on the probability value.

Example 34 may include the apparatus of any one of Example 28 to Example 33, further including one or more of means for providing an offer of travel assistance to the user via a user interface, means for providing a list of the one or more predicted destinations via the user interface, or means for providing travel data for a selected destination from among the one or more predicted destinations via the user interface.

Example 35 may include the apparatus of any one of Example 28 to Example 34, further including means for withholding the offer and the list to automatically provide the travel data to the user based on a confidence threshold that is to be satisfied by the one or more predicted destinations.

Example 36 may include the apparatus of any one of Example 28 to Example 35, further including means for providing navigation data for the selected destination, wherein the navigation data includes a direction to the selected destination, and means for providing route data for the selected destination, wherein the route data includes one more of a nearest part of a shortest route to the selected destination based on a determination that the user is aware of a direction to the selected destination or information for two or more alternative routes to the selected destination.

Thus, techniques described herein may provide travel assistance without wasting time to arrive at a destination and/or minimizing a hazardous condition caused by requiring the user to request travel data. For example, techniques may provide travel assistance when a user is about to start driving rather and/or automatically when driving is detected. Moreover, techniques may provide travel assistance based on more information, a deeper analysis, and/or on a relatively narrower timeline. In addition, techniques may provide a user interface that provides a list of predicted destinations.

Embodiments may, therefore, use advanced learning methods to proactively predict most probable destinations for a specific drive and simply the navigation process to make route selection and/or ETA queries a relatively effortless task. For example, route selection may be simplified by automatically detecting driving intent (e.g., detecting when a user is about to start driving), outputting a list of most probable destinations in the context of a specific drive (e.g., a best time to present data), propose a list of destinations to the user ranked by probability, and/or automatically start a navigation application to provide, with the address of a selected destination, directions and/or alternative routes to the destination (e.g., step-by-step navigation to destination or highlights of the route step-by-step navigation to destination or highlights of the route). Moreover, embodiments may be applied to wearable devices, mobile phones, in vehicle display screens, in graphical user interface, in voice user interface, and so on.

Embodiments are applicable for use with all types of semiconductor integrated circuit ("IC") chips. Examples of these IC chips include but are not limited to processors, controllers, chipset components, programmable logic arrays (PLAs), memory chips, network chips, systems on chip (SoCs), SSD/NAND controller ASICs, and the like. In addition, in some of the drawings, signal conductor lines are represented with lines. Some may be different, to indicate more constituent signal paths, have a number label, to indicate a number of constituent signal paths, and/or have arrows at one or more ends, to indicate primary information flow direction. This, however, should not be construed in a limiting manner. Rather, such added detail may be used in connection with one or more exemplary embodiments to facilitate easier understanding of a circuit. Any represented signal lines, whether or not having additional information, may actually comprise one or more signals that may travel in multiple directions and may be implemented with any suitable type of signal scheme, e.g., digital or analog lines implemented with differential pairs, optical fiber lines, and/or single-ended lines.

Example sizes/models/values/ranges may have been given, although embodiments are not limited to the same. As manufacturing techniques (e.g., photolithography) mature over time, it is expected that devices of smaller size could be manufactured. In addition, well known power/ground connections to IC chips and other components may or may not be shown within the figures, for simplicity of illustration and discussion, and so as not to obscure certain aspects of the embodiments. Further, arrangements may be shown in block diagram form in order to avoid obscuring embodiments, and also in view of the fact that specifics with respect to implementation of such block diagram arrangements are highly dependent upon the platform within which the embodiment is to be implemented, i.e., such specifics should be well within purview of one skilled in the art. Where specific details (e.g., circuits) are set forth in order to describe example embodiments, it should be apparent to one skilled in the art that embodiments can be practiced without, or with variation of, these specific details. The description is thus to be regarded as illustrative instead of limiting.

The term "coupled" may be used herein to refer to any type of relationship, direct or indirect, between the components in question, and may apply to electrical, mechanical, fluid, optical, electromagnetic, electromechanical or other connections. In addition, the terms "first", "second", etc. may be used herein only to facilitate discussion, and carry no particular temporal or chronological significance unless otherwise indicated.

As used in this application and in the claims, a list of items joined by the term "one or more of" or "at least one of" may mean any combination of the listed terms. For example, the phrases "one or more of A, B or C" may mean A; B; C; A and B; A and C; B and C; or A, B and C. In addition, a list of items joined by the term "and so forth" or "etc." may mean any combination of the listed terms as well any combination with other terms.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

We claim:

1. An apparatus comprising:
   a drive intent determiner to determine that a user is to begin driving a vehicle in the near future based on one or more of data corresponding to a mobile device associated with the user that is to indicate the user is approaching the vehicle or data corresponding to the mobile device that is to indicate a connection is established between the mobile device and the vehicle before the user is to start the vehicle;
   a destination determiner to determine one or more predicted destinations when the user is to begin driving the vehicle in the near future; and
   a drive adviser to provide, via a user interface, travel assistance to the user based on the one or more predicted destinations.

2. The apparatus of claim 1, wherein the drive intent determiner is to include,
   a location recognizer to recognize data corresponding to the mobile device that is to indicate the user is currently approaching a parking location of the vehicle, and
   a link recognizer to recognize data corresponding to the mobile device that is to indicate a current wireless connection is established between the mobile device and the vehicle.

3. The apparatus of claim 1, wherein the drive intent determiner is to include,
   a departure recognizer to recognize data that is to indicate a current departure state of the user prior to a departure action by the user and before the user is to start the vehicle,
   a routine recognizer to recognize data that is to indicate a current state satisfies a user routine prior to the departure action by the user and before the user is to start the vehicle,
   a calendar recognizer to recognize data that is to indicate a current state satisfies a user calendar event prior to the departure action by the user and before the user is to start the vehicle,
   a location recognizer to recognize the data corresponding to the mobile device that is to indicate the user is approaching the vehicle during the departure action by the user and before the user is to start the vehicle, and
   a link recognizer to recognize the data corresponding to the mobile device that is to indicate a connection is established between the mobile device and the vehicle when the user is to be in proximity to the vehicle and is to start the vehicle.

4. The apparatus of claim 1, wherein the destination determiner is to include,
   a historical pattern recognizer to recognize historical data including destination visited data, point of interest data, meeting location data, and area searched data, and
   a current state recognizer to recognize current state data including time of day data, day of week data, arrival time data, distance to destination data, and pending meeting data.

5. The apparatus of claim 1, wherein the destination determiner is to include,
   a probability determiner to determine a probability value for the one or more predicted destinations, and
   a sorter to sort the one or more predicted destinations based on the probability value.

6. The apparatus of claim 1, wherein the drive adviser is to include one or more of,
   a prompter to provide an offer of travel assistance to the user via the user interface,
   a list provider to provide a list of the one or more predicted destinations via the user interface, or
   a travel data provider to provide travel data for a selected destination from among the one or more predicted destinations via the user interface.

7. The apparatus of claim 6, wherein the offer and the list are to be withheld when the travel data provider is to automatically provide the travel data to the user based on a confidence threshold that is to be satisfied by the one or more predicted destinations.

8. The apparatus of claim 6, wherein the travel data provider is to include,
   a navigation data provider to provide navigation data for the selected destination, wherein the navigation data is to include a direction to the selected destination, and
   a route data provider to provide route data for the selected destination, wherein the route data is to include one or more of a nearest part of a shortest route to the selected destination based on a determination that the user is aware of the direction to the selected destination or information for two or more alternative routes to the selected destination.

9. At least one computer readable storage medium comprising a set of instructions, which when executed by a computer, cause the computer to:
   determine that a user is to begin driving a vehicle in the near future based on one or more of data corresponding to a mobile device associated with the user that is to indicate the user is approaching the vehicle or data corresponding to the mobile device that is to indicate a connection is established between the mobile device and the vehicle before the user is to start the vehicle;
   determine one or more predicted destinations when the user is to begin driving the vehicle in the near future; and
   provide, via a user interface, travel assistance to the user based on the one or more predicted destinations.

10. The at least one computer readable storage medium of claim 9, wherein the instructions, when executed, cause the computer to:
    recognize data corresponding to the mobile device that is to indicate the user is currently approaching a parking location of the vehicle; and
    recognize data corresponding to the mobile device that is to indicate a current wireless connection is established between the mobile device and the vehicle.

11. The at least one computer readable storage medium of claim 9, wherein the instructions, when executed, cause the computer to:
    recognize data that is to indicate a current departure state of the user prior to a departure action by the user and before the user is to start the vehicle
    recognize data that is to indicate a current state satisfies a user routine prior to the departure action by the user and before the user is to start the vehicle
    recognize data that is to indicate a current state satisfies a user calendar event prior to the departure action by the user and before the user is to start the vehicle;
    recognize the data corresponding to the mobile device that is to indicate the user is approaching the vehicle during the departure action by the user and before the user is to start the vehicle; and
    recognize the data corresponding to the mobile device that is to indicate a connection is established between the mobile device and the vehicle when the user is to be in proximity to the vehicle and is to start the vehicle.

12. The at least one computer readable storage medium of claim 9, wherein the instructions, when executed, cause the computer to one or more of:
recognize historical data including destination visited data, point of interest data, meeting location data, and area searched data; and
recognize current state data including time of day data, day of week data, arrival time data, distance to destination data, and pending meeting data.

13. The at least one computer readable storage medium of claim 9, wherein the instructions, when executed, cause the computer to:
determine a probability value for the one or more predicted destinations; and
sort the one or more predicted destinations based on the probability value.

14. The at least one computer readable storage medium of claim 9, wherein the instructions, when executed, cause the computer to one or more of:
provide an offer of travel assistance to the user via the user interface;
provide a list of the one or more predicted destinations via the user interface; or
provide travel data for a selected destination from among the one or more predicted destinations via the user interface.

15. The at least one computer readable storage medium of claim 14, wherein the instructions, when executed, cause the computer to withhold the offer and the list to automatically provide the travel data to the user based on a confidence threshold that is to be satisfied by the one or more predicted destinations.

16. The at least one computer readable storage medium of claim 14, wherein the instructions, when executed, cause the computer to:
provide navigation data for the selected destination, wherein the navigation data is to include a direction to the selected destination; and
provide route data for the selected destination, wherein the route data is to include one or more of a nearest part of a shortest route to the selected destination based on a determination that the user is aware of the direction to the selected destination or information for two or more alternative routes to the selected destination.

17. A method to provide travel assistance comprising:
determining that a user is to begin driving a vehicle in the near future based on one or more of data corresponding to a mobile device associated with the user that is to indicate the user is approaching the vehicle or data corresponding to the mobile device that is to indicate a connection is established between the mobile device and the vehicle before the user starts a vehicle;
determining one or more predicted destinations when the user is to begin driving the vehicle in the near future; and
providing, via a user interface, travel assistance to the user based on the one or more predicted destinations.

18. The method of claim 17, further including:
recognizing data corresponding to the mobile device that is to indicate the user is currently approaching a parking location of the vehicle; and
recognizing data corresponding to the mobile device that is to indicate a current wireless connection is established between the mobile device and the vehicle.

19. The method of claim 17, further including one or more of:
recognizing historical data including destination visited data, point of interest data, meeting location data, and area searched data; and
recognizing current state data including time of day data, day of week data, arrival time data, distance to destination data, and pending meeting data.

20. The method of claim 17, further including:
determining a probability value for the one or more predicted destinations; and
sorting the one or more predicted destinations based on the probability value.

21. The method of claim 17, further including one or more of:
providing an offer of travel assistance to the user via the user interface;
providing a list of the one or more predicted destinations via the user interface; or
providing travel data for a selected destination from among the one or more predicted destinations via the user interface.

22. The method of claim 21, further including withholding the offer and the list to automatically provide the travel data to the user based on a confidence threshold that is to be satisfied by the one or more predicted destinations.

23. The method of claim 21, further including:
providing navigation data for the selected destination, wherein the navigation data includes a direction to the selected destination; and
providing route data for the selected destination, wherein the route data includes one or more of a nearest part of a shortest route to the selected destination based on a determination that the user is aware of the direction to the selected destination or information for two or more alternative routes to the selected destination.

24. The apparatus of claim 1, wherein the data corresponding to the mobile that is to indicate the user is approaching the vehicle includes location data for the mobile device to be used together with location data for the vehicle including one or more of a parking location from the vehicle, a parking location recorded when the vehicle was parked, or a parking pattern including one or more of an assigned space, a favorite space, a favorite garage, garage parking, or event parking.

25. The apparatus of claim 8, wherein the nearest part is to be a next part relative to the user of the shortest route to the selected destination based on a determination that the user is aware of the direction to the selected destination and only needs the next part.

* * * * *